(12) United States Patent
Liu et al.

(10) Patent No.: US 9,736,269 B2
(45) Date of Patent: *Aug. 15, 2017

(54) METHOD AND SYSTEM FOR SHARING METADATA BETWEEN INTERFACES

(71) Applicant: eBay Inc., San Jose, CA (US)

(72) Inventors: Allen Yihren Liu, San Francisco, CA (US); Philip J. King, San Mateo, CA (US); Ajay K. Agrawal, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,359

(22) Filed: Jan. 27, 2014

(65) Prior Publication Data

US 2014/0143321 A1 May 22, 2014

Related U.S. Application Data

(63) Continuation of application No. 11/508,420, filed on Aug. 23, 2006, now Pat. No. 8,639,782.

(51) Int. Cl.
*H04L 29/08* (2006.01)
*G06F 9/445* (2006.01)

(52) U.S. Cl.
CPC .......... *H04L 67/34* (2013.01); *G06F 9/44505* (2013.01); *H04L 67/025* (2013.01)

(58) Field of Classification Search
CPC .... H04L 67/025; H04L 67/34; G06F 9/44505
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |

(Continued)

FOREIGN PATENT DOCUMENTS

| CA | 2253543 A1 | 3/1997 |
|---|---|---|
| CN | 102129642 A | 7/2011 |

(Continued)

OTHER PUBLICATIONS

"U.S. Appl. No. 09/602,110, Advisory Action mailed May 26, 2006", 3 pgs.

(Continued)

*Primary Examiner* — William Goodchild
(74) *Attorney, Agent, or Firm* — Schwegman Lundberg & Woessner, P.A.

(57) ABSTRACT

A system communicates a client application and a web application and receives configuration data operable within the web application and the client application. The system distributes the configuration data to the client application and the web application. The distributed configuration data is then used to configure the client application and the web application.

17 Claims, 9 Drawing Sheets

(56) References Cited

U.S. PATENT DOCUMENTS

| | | |
|---|---|---|
| 5,063,507 A | 11/1991 | Lindsey et al. |
| 5,063,523 A | 11/1991 | Vrenjak |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,392,428 A | 2/1995 | Robins |
| 5,394,324 A | 2/1995 | Clearwater |
| 5,426,281 A | 6/1995 | Abecassis |
| 5,485,510 A | 1/1996 | Colbert |
| 5,535,403 A | 7/1996 | Li et al. |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,696,909 A | 12/1997 | Wallner |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,727,165 A | 3/1998 | Ordish et al. |
| 5,758,126 A | 5/1998 | Daniels et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,835,911 A | 11/1998 | Nakagawa et al. |
| 5,845,265 A | 12/1998 | Woolston |
| 5,845,266 A | 12/1998 | Lupien et al. |
| 5,846,265 A | 12/1998 | McGregor et al. |
| 5,850,442 A | 12/1998 | Muftic |
| 5,857,188 A | 1/1999 | Douglas |
| 5,857,201 A | 1/1999 | Wright et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,909,544 A | 6/1999 | Anderson, II et al. |
| 5,920,725 A | 7/1999 | Ma et al. |
| 5,922,074 A | 7/1999 | Richard et al. |
| 5,923,885 A | 7/1999 | Johnson et al. |
| 5,924,072 A | 7/1999 | Havens |
| 5,926,794 A | 7/1999 | Fethe |
| 5,944,790 A | 8/1999 | Levy |
| 5,974,412 A | 10/1999 | Hazlehurst et al. |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,073,117 A | 6/2000 | Oyanagi et al. |
| 6,085,169 A | 7/2000 | Walker et al. |
| 6,085,176 A | 7/2000 | Woolston |
| 6,092,035 A | 7/2000 | Kurachi et al. |
| 6,104,815 A | 8/2000 | Alcorn et al. |
| 6,119,137 A | 9/2000 | Smith et al. |
| 6,119,229 A | 9/2000 | Martinez et al. |
| 6,134,533 A | 10/2000 | Shell |
| 6,141,653 A | 10/2000 | Conklin et al. |
| 6,144,984 A | 11/2000 | DeBenedictis et al. |
| 6,151,589 A | 11/2000 | Aggarwal et al. |
| 6,161,082 A | 12/2000 | Goldberg et al. |
| 6,167,567 A | 12/2000 | Chiles et al. |
| 6,178,408 B1 | 1/2001 | Copple et al. |
| 6,192,407 B1 | 2/2001 | Smith et al. |
| 6,202,051 B1 | 3/2001 | Woolston |
| 6,226,412 B1 | 5/2001 | Schwab |
| 6,243,691 B1 | 6/2001 | Fisher et al. |
| 6,266,651 B1 | 7/2001 | Woolston |
| 6,266,652 B1 | 7/2001 | Godin et al. |
| 6,272,675 B1 | 8/2001 | Schrab et al. |
| 6,317,727 B1 | 11/2001 | May |
| 6,336,105 B1 | 1/2002 | Conklin et al. |
| 6,415,270 B1 | 7/2002 | Rackson et al. |
| 6,421,653 B1 | 7/2002 | May |
| 6,446,048 B1 | 9/2002 | Wells et al. |
| 6,567,821 B1 | 5/2003 | Polk |
| 6,574,239 B1 | 6/2003 | Dowling et al. |
| 6,598,026 B1 | 7/2003 | Ojha et al. |
| 6,623,529 B1 | 9/2003 | Lakritz |
| 6,647,373 B1 | 11/2003 | Carlton-Foss |
| 6,665,676 B2 | 12/2003 | Twig et al. |
| 6,732,161 B1 | 5/2004 | Hess et al. |
| 6,771,291 B1 | 8/2004 | DiStefano |
| 6,799,165 B1 | 9/2004 | Boesjes |
| 7,007,026 B2 | 2/2006 | Wilkinson et al. |
| 7,076,453 B2 | 7/2006 | Jammes et al. |
| 7,133,835 B1 | 11/2006 | Fusz et al. |
| 7,165,041 B1 | 1/2007 | Guheen et al. |
| 7,191,393 B1 | 3/2007 | Chin et al. |
| 7,234,110 B2 | 6/2007 | Sumitomo |
| 7,315,826 B1 | 1/2008 | Guheen et al. |
| 7,337,133 B1 | 2/2008 | Bezos et al. |
| 7,340,389 B2 | 3/2008 | Vargas |
| 7,941,348 B2 | 5/2011 | Veres et al. |
| 8,078,505 B2 | 12/2011 | Veres et al. |
| 8,255,286 B2 | 8/2012 | Veres et al. |
| 8,442,871 B2 | 5/2013 | Veres et al. |
| 8,639,782 B2 | 1/2014 | Liu et al. |
| 8,719,041 B2 | 5/2014 | Veres et al. |
| 9,092,792 B2 | 7/2015 | Veres et al. |
| 2001/0027472 A1* | 10/2001 | Guan ............... H04W 4/00 709/203 |
| 2001/0029455 A1 | 10/2001 | Chin et al. |
| 2001/0039531 A1 | 11/2001 | Aoki |
| 2001/0049707 A1 | 12/2001 | Tran |
| 2002/0029182 A1 | 3/2002 | Nakagawa |
| 2002/0042835 A1 | 4/2002 | Pepin et al. |
| 2002/0046137 A1 | 4/2002 | Odom et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0099562 A1 | 7/2002 | Bruce, Sr. et al. |
| 2002/0116318 A1 | 8/2002 | Thomas et al. |
| 2002/0123959 A1 | 9/2002 | Mozley et al. |
| 2002/0147656 A1 | 10/2002 | Tam et al. |
| 2002/0147784 A1 | 10/2002 | Gold et al. |
| 2002/0184610 A1 | 12/2002 | Chong et al. |
| 2003/0005159 A1 | 1/2003 | Kumhyr |
| 2003/0018885 A1 | 1/2003 | Landsman et al. |
| 2003/0041014 A1 | 2/2003 | Grey et al. |
| 2003/0055747 A1 | 3/2003 | Carr et al. |
| 2003/0069829 A1 | 4/2003 | Gathman et al. |
| 2003/0083952 A1 | 5/2003 | Simpson et al. |

(56) References Cited

U.S. PATENT DOCUMENTS

| | | |
|---|---|---|
| 2003/0110047 A1 | 6/2003 | Santosuosso et al. |
| 2003/0115484 A1 | 6/2003 | Moriconi et al. |
| 2003/0139975 A1 | 7/2003 | Perkowski |
| 2003/0154134 A1 | 8/2003 | Wang |
| 2003/0167213 A1 | 9/2003 | Jammes et al. |
| 2003/0229545 A1 | 12/2003 | Veres et al. |
| 2003/0229554 A1 | 12/2003 | Veres et al. |
| 2004/0078297 A1 | 4/2004 | Veres et al. |
| 2005/0102151 A1 | 5/2005 | Fuwa et al. |
| 2006/0074792 A1 | 4/2006 | Wagoner et al. |
| 2007/0016893 A1* | 1/2007 | Branda ............... G06F 11/3476 717/127 |
| 2007/0112643 A1 | 5/2007 | Veres et al. |
| 2011/0231530 A1 | 9/2011 | Veres et al. |
| 2012/0047029 A1 | 2/2012 | Veres et al. |
| 2012/0246233 A1 | 9/2012 | Veres et al. |
| 2014/0324594 A1 | 10/2014 | Veres et al. |
| 2015/0127502 A1 | 5/2015 | Knepfle et al. |
| 2015/0371322 A1 | 12/2015 | Veres et al. |

FOREIGN PATENT DOCUMENTS

| | | | |
|---|---|---|---|
| FR | 2658635 | A1 | 8/1991 |
| JP | 2001000469 | A | 1/2001 |
| KR | 20000018041 | A | 4/2000 |
| KR | 20000024372 | A | 5/2000 |
| KR | 20000049744 | A | 8/2000 |
| KR | 20020059971 | A | 7/2002 |
| KR | 20000037395 | A | 4/2008 |
| NL | 9300266 | A | 9/1994 |
| WO | WO-9215174 | A1 | 9/1992 |
| WO | WO-9517711 | A1 | 6/1995 |
| WO | WO-9634356 | A1 | 10/1996 |
| WO | WO-9737315 | A1 | 10/1997 |
| WO | WO-9963461 | A1 | 12/1999 |
| WO | WO-0058862 | A2 | 10/2000 |
| WO | WO-0102926 | A2 | 1/2001 |
| WO | WO-0182115 | A1 | 11/2001 |
| WO | WO-03038560 | A2 | 5/2003 |
| WO | WO-03104931 | A3 | 12/2003 |

OTHER PUBLICATIONS

"U.S. Appl. No. 09/602,110, Amendment filed Apr. 28, 2008", 17 pgs.

"U.S. Appl. No. 09/602,110, Appeal Brief filed Dec. 15, 2006", 34 pgs.

"U.S. Appl. No. 09/602,110, Appeal Decision mailed Feb. 28, 2008", 13 pgs.

"U.S. Appl. No. 09/602,110, Appeal Decision mailed May 29, 2013", 10 pgs.

"U.S. Appl. No. 09/602,110, Decision on Pre-Appeal Brief mailed Aug. 15, 2006", 2 pgs.

"U.S. Appl. No. 09/602,110, Examiner's Answer to Appeal Brief mailed Mar. 7, 2007", 13 pgs.

"U.S. Appl. No. 09/602,110, Final Office Action mailed Mar. 8, 2006", 11 pgs.

"U.S. Appl. No. 09/602,110, Final Office Action mailed Sep. 2, 2004", 13 pgs.

"U.S. Appl. No. 09/602,110, Final Office Action mailed Nov. 17, 2008", 12 pgs.

"U.S. Appl. No. 09/602,110, Final Office Action mailed Nov. 21, 2005", 11 pgs.

"U.S. Appl. No. 09/602,110, Final Office Action mailed Nov. 25, 2009", 17 pgs.

"U.S. Appl. No. 09/602,110, Non Final Office Action mailed Jan. 21, 2004", 13 pgs.

"U.S. Appl. No. 09/602,110, Non Final Office Action mailed Apr. 5, 2005", 11 pgs.

"U.S. Appl. No. 09/602,110, Non-Final Office Action mailed Mar. 18, 2009", 19 pgs.

"U.S. Appl. No. 09/602,110, Non-Final Office Action mailed Jul. 21, 2008", 12 pgs.

"U.S. Appl. No. 09/602,110, Pre-Appeal Brief Request filed Jun. 27, 2006", 4 pgs.

"U.S. Appl. No. 09/602,110, Reply Brief filed May 7, 2007", 11 pgs.

"U.S. Appl. No. 09/602,110, Response filed Jan. 3, 2005 to Final Office Action mailed Sep. 2, 2004", 16 pgs.

"U.S. Appl. No. 09/602,110, Response filed Jan. 23, 2006 to Final Office Action mailed Nov. 21, 2005", 15 pgs.

"U.S. Appl. No. 09/602,110, Response filed Jan. 25, 2010 to Final Office Action mailed Nov. 25, 2009", 22 pgs.

"U.S. Appl. No. 09/602,110, Response filed Feb. 17, 2009 to Final Office Action mailed Nov. 17, 2008", 21 pgs.

"U.S. Appl. No. 09/602,110, Response filed May 8, 2006 to Final Office Action mailed Mar. 8, 2006", 17 pgs.

"U.S. Appl. No. 09/602,110, Response filed May 21, 2004 to Non-Final Office Action mailed Jan. 21, 2004", 18 pgs.

"U.S. Appl. No. 09/602,110, Response filed Jul. 20, 2009 to Non Final Office Action mailed Mar. 18, 2009", 21 pgs.

"U.S. Appl. No. 09/602,110, Response filed Aug. 4, 2005 to Non Final Office Action mailed Apr. 5, 2005", 19 pgs.

"U.S. Appl. No. 09/602,110, Response filed Oct. 21, 2008 to Non-Final Office Action mailed Jul. 21, 2008", 19 pgs.

"U.S. Appl. No. 10/252,126, Appeal Brief filed Feb. 4, 2009", 22 pgs.

"U.S. Appl. No. 10/252,126, Final Office Action mailed Feb. 26, 2008", 12 pgs.

"U.S. Appl. No. 10/252,126, Final Office Action mailed Jun. 27, 2006", 11 pgs.

"U.S. Appl. No. 10/252,126, Final Office Action mailed Sep. 4, 2008", 13 pgs.

"U.S. Appl. No. 10/252,126, Non Final Office Action mailed Jan. 30, 2007", 9 pgs.

"U.S. Appl. No. 10/252,126, Non Final Office Action mailed Feb. 3, 2006", 8 pgs.

"U.S. Appl. No. 10/252,126, Non Final Office Action mailed Aug. 20, 2007", 8 pgs.

"U.S. Appl. No. 10/252,126, Response filed May 3, 2006 to Non Final Office Action mailed Feb. 3, 2006", 7 pgs.

"U.S. Appl. No. 10/252,126, Response filed Jun. 25, 2007 to Non Final Office Action mailed Jan. 30, 2007", 11 pgs.

"U.S. Appl. No. 10/252,126, Response filed Jul. 28, 2008 to Final Office Action mailed Feb. 26, 2008", 7 pgs.

"U.S. Appl. No. 10/252,126, Response filed Oct. 27, 2006 to Final Office Action mailed Jun. 27, 2006", 8 pgs.

"U.S. Appl. No. 10/252,126, Response filed Dec. 20, 2007 to Non-Final Office Action mailed Aug. 20, 2007", 8 pgs.

"U.S. Appl. No. 10/252,126, Response filed Dec. 29, 2005 to Restriction Requirement mailed Oct. 31, 2005", 5 pgs.

"U.S. Appl. No. 10/252,126, Restriction Requirement mailed Oct. 31, 2005", 7 pgs.

"U.S. Appl. No. 10/252,127, Advisory Action mailed Jan. 10, 2007", 3 pgs.

"U.S. Appl. No. 10/252,127, Advisory Action mailed May 1, 2008", 3 pgs.

"U.S. Appl. No. 10/252,127, Advisory Action mailed Dec. 12, 2008", 3 pgs.

"U.S. Appl. No. 10/252,127, Appeal Brief filed Mar. 11, 2009", 27 pgs.

"U.S. Appl. No. 10/252,127, Applicant's Summary of Examiner Interview filed Apr. 15, 2011", 2 pgs.

"U.S. Appl. No. 10/252,127, Decision on Pre-Appeal Brief mailed Feb. 11, 2009", 2 pgs.

"U.S. Appl. No. 10/252,127, Decision on Pre-Appeal Brief mailed May 12, 2008", 3 pgs.

"U.S. Appl. No. 10/252,127, Decision on Pre-Appeal Brief Request mailed Feb. 11, 2009", 2 pgs.

"U.S. Appl. No. 10/252,127, Decision on Pre-Appeal Brief Request mailed May 12, 2008", 2 pgs.

"U.S. Appl. No. 10/252,127, Decision on Pre-Appeal Brief Request mailed May 14, 2010", 2 pgs.

"U.S. Appl. No. 10/252,127, Final Office Action mailed Jan. 7, 2010", 11 pgs.

(56) References Cited

OTHER PUBLICATIONS

"U.S. Appl. No. 10/252,127, Final Office Action mailed Jan. 11, 2008", 11 pgs.
"U.S. Appl. No. 10/252,127, Final Office Action mailed Sep. 4, 2008", 12 pgs.
"U.S. Appl. No. 10/252,127, Final Office Action mailed Oct. 6, 2006", 10 pgs.
"U.S. Appl. No. 10/252,127, Non Final Office Action mailed Mar. 21, 2006", 9 pgs.
"U.S. Appl. No. 10/252,127, Non Final Office Action mailed Jul. 11, 2007", 9 pgs.
"U.S. Appl. No. 10/252,127, Non-Final Office Action mailed Jun. 26, 2009", 14 pgs.
"U.S. Appl. No. 10/252,127, Notice of Allowance mailed Mar. 18, 2011", 16 pgs.
"U.S. Appl. No. 10/252,127, Pre-Appeal Brief Request filed Jan. 5, 2009", 5 pgs.
"U.S. Appl. No. 10/252,127, Pre-Appeal Brief Request filed Apr. 10, 2008", 5 pgs.
"U.S. Appl. No. 10/252,127, Response filed Mar. 8, 2010 to Final Office Action mailed Jan. 7, 2010", 17 pgs.
"U.S. Appl. No. 10/252,127, Response filed Mar. 27, 2008 to Final Office Action mailed Jan. 11, 2008", 16 pgs.
"U.S. Appl. No. 10/252,127, Response filed Jun. 12, 2008 to Advisory Action mailed May 1, 2008", 16 pgs.
"U.S. Appl. No. 10/252,127, Response filed Jun. 12, 2008 to Final Office Action mailed Jan. 11, 2008", 16 pgs.
"U.S. Appl. No. 10/252,127, Response filed Jun. 21, 2006 to Non Final Office Action mailed Mar. 21, 2006", 8 pgs.
"U.S. Appl. No. 10/252,127, Response filed Sep. 28, 2009 to Non Final Office Action mailed Jun. 26, 2009", 16 pgs.
"U.S. Appl. No. 10/252,127, Response filed Oct. 11, 2007 to Non-Final Office Action mailed Jul. 11, 2007", 15 pgs.
"U.S. Appl. No. 10/252,127, Response filed Nov. 4, 2008 to Final Office Action mailed Sep. 4, 2008", 22 pgs.
"U.S. Appl. No. 10/252,127, Response filed Dec. 6, 2006 to Final Office Action mailed Oct. 6, 2006", 14 pgs.
"U.S. Appl. No. 10/252,128, Appeal Brief filed Dec. 15, 2009", 23 pgs.
"U.S. Appl. No. 10/252,128, Appeal Decision mailed Jan. 31, 2013", 6 pgs.
"U.S. Appl. No. 10/252,128, Decision on Pre-Appeal Brief Request mailed Oct. 15, 2009", 2 pgs.
"U.S. Appl. No. 10/252,128, Final Office Action mailed Apr. 3, 2009", 27 pgs.
"U.S. Appl. No. 10/252,128, Non-Final Office Action mailed Mar. 21, 2008", 12 pgs.
"U.S. Appl. No. 10/252,128, Notice of Allowance mailed May 30, 2013", 9 pgs.
"U.S. Appl. No. 10/252,128, Notice of Allowance mailed Dec. 23, 2013", 10 pgs.
"U.S. Appl. No. 10/252,128, Pre-Appeal Brief Request filed Aug. 3, 2009", 4 pgs.
"U.S. Appl. No. 10/252,128, Response filed Jul. 21, 2008 to Non-Final Office Action mailed Mar. 21, 2008", 11 pgs.
"U.S. Appl. No. 10/252,128, Response filed Dec. 23, 2008 to Restriction Requirement Nov. 24, 2008", 10 pgs.
"U.S. Appl. No. 10/252,128, Restriction Requirement mailed Nov. 24, 2008", 8 pgs.
"U.S. Appl. No. 10/252,129, Advisory Action mailed Mar. 13, 2007", 3 pgs.
"U.S. Appl. No. 10/252,129, Advisory Action mailed Sep. 2, 2009", 2 pgs.
"U.S. Appl. No. 10/252,129, Advisory Action mailed Oct. 6, 2009", 3 pgs.
"U.S. Appl. No. 10/252,129, Advisory Action mailed Nov. 26, 2008", 3 pgs.
"U.S. Appl. No. 10/252,129, Appeal Brief filed Apr. 25, 2011", 32 pgs.
"U.S. Appl. No. 10/252,129, Examiner Interview Summary mailed Mar. 19, 2008", 2 pgs.
"U.S. Appl. No. 10/252,129, Examiner Interview Summary mailed Mar. 31, 2009", 2 pgs.
"U.S. Appl. No. 10/252,129, Examiner Interview Summary mailed Jul. 11, 2008", 2 pgs.
"U.S. Appl. No. 10/252,129, Examiner's Answer to Appeal Brief mailed May 13, 2011", 19 pgs.
"U.S. Appl. No. 10/252,129, Final Office Action mailed Apr. 23, 2010", 18 pgs.
"U.S. Appl. No. 10/252,129, Final Office Action mailed May 29, 2008", 9 pgs.
"U.S. Appl. No. 10/252,129, Final Office Action mailed Jun. 18, 2009", 12 pgs.
"U.S. Appl. No. 10/252,129, Final Office Action mailed Sep. 15, 2008", 11 pgs.
"U.S. Appl. No. 10/252,129, Final Office Action mailed Oct. 5, 2007", 10 pgs.
"U.S. Appl. No. 10/252,129, Final Office Action mailed Dec. 27, 2006", 12 pgs.
"U.S. Appl. No. 10/252,129, Non Final Office Action mailed May 15, 2007", 10 pgs.
"U.S. Appl. No. 10/252,129, Non Final Office Action mailed Aug. 18, 2006", 10 pgs.
"U.S. Appl. No. 10/252,129, Non-Final Office Action mailed Jan. 14, 2008", 10 pgs.
"U.S. Appl. No. 10/252,129, Non-Final Office Action mailed Feb. 10, 2009", 11 pgs.
"U.S. Appl. No. 10/252,129, Non-Final Office Action mailed Nov. 12, 2009", 19 pgs.
"U.S. Appl. No. 10/252,129, Response filed Feb. 12, 2010 to Non Final Office Action mailed Nov. 12, 2009", 20 pgs.
"U.S. Appl. No. 10/252,129, Response filed Feb. 27, 2007 to Final Office Action mailed Dec. 27, 2006", 14 pgs.
"U.S. Appl. No. 10/252,129, Response filed Apr. 14, 2008 to Non-Final Office Action mailed Jan. 14, 2008", 14 pgs.
"U.S. Appl. No. 10/252,129, Response filed May 11, 2009 to Non Final Office Action mailed Feb. 10, 2009", 15 pgs.
"U.S. Appl. No. 10/252,129, Response filed Jul. 31, 2008 to Final Office Action mailed May 29, 2008", 13 pgs.
"U.S. Appl. No. 10/252,129, Response filed Aug. 13, 2007 to Non-Final Office Action mailed May 15, 2007", 16 pgs.
"U.S. Appl. No. 10/252,129, Response filed Aug. 18, 2009 to Final Office Action mailed Jun. 18, 2009", 19 pgs.
"U.S. Appl. No. 10/252,129, Response filed Sep. 18, 2009 to Advisory Action mailed Sep. 2, 2009", 19 pgs.
"U.S. Appl. No. 10/252,129, Response filed Oct. 5, 2006 to Non Final Office Action mailed Aug. 18, 2006", 15 pgs.
"U.S. Appl. No. 10/252,129, Response filed Oct. 19, 2009 to Advisory Action mailed Oct. 6, 2009", 17 pgs.
"U.S. Appl. No. 10/252,129, Response filed Nov. 11, 2008 to Final Office Action mailed Sep. 15, 2008", 14 pgs.
"U.S. Appl. No. 10/252,129, Response filed Nov. 26, 2007 to Final Office Action mailed Oct. 5, 2007", 15 pgs.
"U.S. Appl. No. 10/252,129, Response filed Dec. 2, 2008 to Final Office Action mailed Sep. 15, 2008", 14 pgs.
"U.S. Appl. No. 11/508,420, Advisory Action mailed Oct. 8, 2010", 3 pgs.
"U.S. Appl. No. 11/508,420, Advisory Action mailed Oct. 29, 2009", 2 pgs.
"U.S. Appl. No. 11/508,420, Appeal Brief filed Jan. 19, 2011", 23 pgs.
"U.S. Appl. No. 11/508,420, Decision on Pre-Appeal Brief Request mailed Dec. 21, 2010", 2 pgs.
"U.S. Appl. No. 11/508,420, Final Office Action mailed Jul. 22, 2010", 12 pgs.
"U.S. Appl. No. 11/508,420, Final Office Action mailed Jul. 31, 2009", 23 pgs.
"U.S. Appl. No. 11/508,420, Final Office Action mailed Aug. 17, 2012", 12 pgs.
"U.S. Appl. No. 11/508,420, Non Final Office Action mailed Mar. 9, 2012", 11 pgs.

(56) References Cited

OTHER PUBLICATIONS

"U.S. Appl. No. 11/508,420, Non Final Office Action mailed Apr. 27, 2011", 15 pgs.
"U.S. Appl. No. 11/508,420, Non Final Office Action mailed Oct. 5, 2011", 12 pgs.
"U.S. Appl. No. 11/508,420, Non-Final Office Action mailed Feb. 5, 2009", 18 pgs.
"U.S. Appl. No. 11/508,420, Non-Final Office Action mailed Dec. 30, 2009", 18 pgs.
"U.S. Appl. No. 11/508,420, Notice of Allowance mailed Sep. 18, 2013", 6 pgs.
"U.S. Appl. No. 11/508,420, Pre-Appeal Brief Request filed Oct. 22, 2010", 5 pgs.
"U.S. Appl. No. 11/508,420, Response filed Apr. 30, 2010 to Non Final Office Action mailed Dec. 30, 2009", 13 pgs.
"U.S. Appl. No. 11/508,420, Response filed May 5, 2009 to Non Final Office Action mailed Feb. 5, 2009", 11 pgs.
"U.S. Appl. No. 11/508,420, Response filed Jun. 11, 2012 to Non Final Office Action mailed Mar. 9, 2012", 14 pgs.
"U.S. Appl. No. 11/508,420, Response filed Jul. 15, 2011 to Non Final Office Action mailed Apr. 27, 2011", 11 pgs.
"U.S. Appl. No. 11/508,420, Response filed Sep. 21, 2010 to Final Office Action mailed Jul. 22, 2010", 13 pgs.
"U.S. Appl. No. 11/508,420, Response filed Sep. 30, 2009 to Final Office Action mailed Jul. 31, 2009", 13 pgs.
"U.S. Appl. No. 11/508,420, Response filed Nov. 12, 2012 to Final Office Action mailed Aug. 17, 2012", 11 pgs.
"U.S. Appl. No. 11/508,420, Response filed Dec. 22, 2011 to Non Final Office Action mailed Oct. 5, 2011", 11 pgs.
"U.S. Appl. No. 11/647,728, Non-Final Office Action mailed Mar. 8, 2010", 18 pgs.
"U.S. Appl. No. 13/080,426, Non Final Office Action mailed Oct. 31, 2011", 8 pgs.
"U.S. Appl. No. 13/080,426, Notice of Allowance mailed Jan. 26, 2012", 7 pgs.
"U.S. Appl. No. 13/080,426, Notice of Allowance mailed Apr. 23, 2012", 7 pgs.
"U.S. Appl. No. 13/080,426, Response filed Dec. 28, 2011 to Non Final Office Action mailed Oct. 31, 2011", 9 pgs.
"U.S. Appl. No. 13/285,916, Advisory Action mailed Jan. 30, 2013", 3 pgs.
"U.S. Appl. No. 13/285,916, Final Office Action mailed Nov. 21, 2012", 17 pgs.
"U.S. Appl. No. 13/285,916, Non Final Office Action mailed Jun. 4, 2012", 16 pgs.
"U.S. Appl. No. 13/285,916, Non Final Office Action mailed Jul. 15, 2013", 17 pgs.
"U.S. Appl. No. 13/285,916, Response filed Jan. 17, 2013 to Final Office Action mailed Nov. 21, 2012", 15 pgs.
"U.S. Appl. No. 13/285,916, Response filed Aug. 30, 2012 to Non Final Office Action mailed Jun. 4, 2012", 15 pgs.
"U.S. Appl. No. 13/489,646, 312 Amendment filed Mar. 7, 2013", 4 pgs.
"U.S. Appl. No. 13/489,646, Non Final Office Action mailed Sep. 19, 2012", 8 pgs.
"U.S. Appl. No. 13/489,646, Notice of Allowance mailed Jan. 10, 2013", 7 pgs.
"U.S. Appl. No. 13/489,646, PTO Response to 312 Amendment mailed Mar. 14, 2013", 2 pgs.
"U.S. Appl. No. 13/489,646, Response filed Dec. 3, 2012 to Non Final Office Action mailed Sep. 19, 2012", 11 pgs.
"Chinese Application Serial No. 03813485.3, Office Action Mailed Jan. 9, 2009", with English translation of claims, 9 pgs.
"Chinese Application Serial No. 03813485.3, Office Action Mailed Jun. 24, 2010", with translation of claims, 9 pgs.
"Chinese Application Serial No. 03813485.3, Office Action mailed Sep. 25, 2009", with English translation of claims, 15 pgs.
"Chinese Application Serial No. 03813485.3, Re-examination Decision mailed Nov. 29, 2010", English translation of claims, 18 pgs.
"Chinese Application Serial No. 03813485.3, Response filed May 25, 2009 to Office Action mailed Jan. 9, 2009", with English translation of claims, 9 pgs.
"Chinese Application Serial No. 03813485.3, Response to Notification of Reexamination Filed: Aug. 9, 2010", with English translation of claims, 23 pgs.
"Chinese Application Serial No. 201110049654.X—Rejection Decision mailed Nov. 5, 2012", with English translation of claims, 16 pgs.
"Chinese Application Serial No. 201110049654.X, Office Action mailed Jan. 5, 2012", With English Translation, 10 pgs.
"Chinese Application Serial No. 201110049654.X, Office Action mailed Jul. 11, 2012", with English translation of claims, 10 pgs.
"Chinese Application Serial No. 201110049654.X, Response filed May 21, 2012 to Office Action mailed Jan. 5, 2012", with English translation of claims, 13 pgs.
"European Application Serial No. 03757395.3, Office Action mailed Oct. 8, 2010", 3 pgs.
"European Application Serial No. 03757395.3, Office Action mailed Dec. 8, 2005", 1 pg.
"European Application Serial No. 03757395.3, Office Action mailed Dec. 17, 2007", 21 pgs.
"European Application Serial No. 03757395.3, Office Action Response filed Apr. 18, 2011", 9 pgs.
"European Application Serial No. 03757395.3, Response filed Feb. 3, 2005 to Office Action mailed Dec. 17, 2004", 6 pgs.
"European Application Serial No. 03757395.3, Response filed Apr. 10, 2012 to Summons to Attend Oral Proceedings mailed Feb. 13, 2012", 20 pgs.
"European Application Serial No. 03757395.3, Search Report mailed Sep. 4, 2009", 2 pgs.
"European Application Serial No. 03757395.3, Summons to Attend Oral Proceedings mailed Feb. 13, 2012", 5 pgs.
"Indian Application Serial No. 1921/KOLNP/2004, Decision to Grant mailed Nov. 18, 2009", 2 pgs.
"Indian Application Serial No. 1921/KOLNP/2004, First Examination Report mailed Apr. 7, 2008", 11 pgs.
"Indian Application Serial No. 1921/KOLNP/2004, Response filed Mar. 6, 2009 to Examiner's First Report mailed Apr. 7, 2008", 13 pgs.
"International Application Serial No. PCT/US00/17136 International Search Report mailed Nov. 16, 2000", 6 pgs.
"International Application Serial No. PCT/US00/17136, International Preliminary Examination Report mailed Mar. 31, 2001", 4 pgs.
"International Application Serial No. PCT/US00/32088, International Search Report mailed Apr. 4, 2001", 6 pgs.
"International Application Serial No. PCT/US01/02584, International Search Report mailed Apr. 16, 2001", 4 pgs.
"International Application Serial No. PCT/US01/04811, International Search Report mailed Jun. 28, 2001", 6 pgs.
"International Application Serial No. PCT/US01/12398 International Search Report mailed Aug. 27, 2001", 3 pgs.
"International Application Serial No. PCT/US01/23854, International Search Report mailed Dec. 28, 2001", 6 pgs.
"International Application Serial No. PCT/US02/04692, International Search Report mailed Jun. 12, 2002", 5 pgs.
"International Application Serial No. PCT/US03/17915, Article 34 Amendment filed Dec. 17, 2003", 5 pgs.
"International Application Serial No. PCT/US03/17915, International Preliminary Report mailed Mar. 26, 2004", 10 pgs.
"International Application Serial No. PCT/US03/17915, International Search Report Nov. 26, 2003", 6 pgs.
"International Application Serial No. PCT/US99/18510, International Search Report mailed Oct. 29, 1999", 4 pgs.
"International Application Serial No. PCT/US99/29312, International Search Report mailed Apr. 18, 2000", 6 pgs.
"Korean Application Serial No. 2004-702020, Notice of Decision to Grant mailed Feb. 11, 2010", with English translation of claims, 3 pgs.
"Korean Application Serial No. 2004-702020, Response filed Jun. 30, 2009 to Office Action mailed Apr. 30, 2009", with English translation of claims, 43 pgs.

(56) References Cited

OTHER PUBLICATIONS

"Korean Application Serial No. 2004-702020, Response filed Dec. 24, 2009 to Final Office Action mailed Nov. 24, 2009", with English translation of claims, 36 pgs.

"Korean Application Serial No. 2004-702020, Voluntary Amendment filed Oct. 20, 2006", 260 pgs.

"Korean Application Serial No. 2004-7020202, Final Office Action mailed Nov. 24, 2009", with English translation of claims, 6 pgs.

"Korean Application Serial No. 2004-7020202, Office Action mailed Apr. 30, 2009", with English translation of claims, 6 pgs.

"Korean Application Serial No. 2004-7020202, Office Action mailed Aug. 29, 2008", with English translation of claims, 17 pgs.

"Korean Application Serial No. 2004-7020202, Preliminary Rejection mailed Nov. 30, 2007", with English translation of claims, 19 pgs.

"Korean Application Serial No. 2004-7020202, Response filed Apr. 30, 2008", with English translation of claims, 75 pgs.

"Korean Application Serial No. 2004-7020202, Response filed Dec. 29, 2008", with English translation of claims, 68 pgs.

"Korean Application Serial No. 2009-7027103, Final Office Action mailed Sep. 28, 2010", with English translation of claims, 5 pgs.

"Korean Application Serial No. 2009-7027103, Notice of Decision to Grant mailed Feb. 14, 2014", with English translation of claims, 2 pgs.

"Korean Application Serial No. 2009-7027103, Office Action mailed, Mar. 26, 2010", with translation of claims, 9 pgs.

"Korean Application Serial No. 2009-7027103, Response filed May 26, 2010 to Office Action mailed Mar. 26, 2010", with English translation of claims, 29 pgs.

"Korean Divisional Application Serial No. 2009-7027103, Appeal Filed Dec. 29, 2010 to Final Office Action mailed Sep. 28, 2010", with English translation of claims, 42 pgs.

Clemons, E., "Evaluating the prospects for alternative electronic securities", Proceedings of ICIS 91: 12th International Conference on Information Systems, (Dec. 16-18, 1991), 53-63.

Graham, Ian, "The Emergence of Linked Fish Markets in Europe", Electronic Markets. vol. 8, No. 2, (1998), 29-32.

Hess, C. M, et al., "Computerized Loan Organization System: An Industry Case Study of the Electronic Markets Hypothesis", MIS Quarterly, vol. 18(3), (Sep. 1994), 251-275.

Klein, Stefan, "Introduction to Electronic Auctions", Focus Theme, vol. 7, No. 4, (1997), 3-6.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Malone, T., et al., "Electronic Markets and Electronic Hierarchies", Communications of the ACM, vol. 30, No. 6, (Jun. 1987), 484-497.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Merrill, K., "GE Capital to Extend Integrator Buying Spree", Computer Reseller News, (Jul. 1996), pp. 2 and 32.

Neo, B. S, "The implementation of an electronic market for pig trading in Singapore", Journal of Strategic Information Systems; vol. 1(5), (Dec. 1992), 278-288.

Post, D. L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1998), 11-18.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Schneider, G. M, et al., "An Introduction to Programming and Problem Solving with Pascal", An Introduction to Programming and Problem Solving with Pascal, Second Edition, John Wiley & Sons, Inc., New York, (1982), 3 Pages.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-16.

Zwass, V., "Electronic Commerce: Structures and Issues", International Journal of Electronic Commerce, Fall 1996, vol. 1, No. 1, (Fall 1996), 3-23.

"U.S. Appl. No. 09/602,110, Decision on Pre-Appeal Brief mailed Mar. 28, 2014", 2 pgs.

"U.S. Appl. No. 09/602,110, Final Office Action mailed Sep. 10, 2014", 19 pgs.

"U.S. Appl. No. 09/602,110, Pre-Appeal Brief Request filed Mar. 20, 2014", 5 pgs.

"U.S. Appl. No. 10/252,129, Amendment filed May 20, 2014", 17 pgs.

"U.S. Appl. No. 10/252,129, Appeal Decision mailed Mar. 20, 2014", 13 pgs.

"U.S. Appl. No. 10/252,129, Examiner Interview Summary mailed May 15, 2015", 3 pgs.

"U.S. Appl. No. 10/252,129, Examiner Interview Summary mailed Dec. 1, 2014", 3 pgs.

"U.S. Appl. No. 10/252,129, Final Office Action mailed Apr. 22, 2015", 35 pgs.

"U.S. Appl. No. 10/252,129, Non Final Office Action mailed Sep. 23, 2014", 31 pgs.

"U.S. Appl. No. 10/252,129, Non Final Office Action mailed Nov. 20, 2015", 35 pgs.

"U.S. Appl. No. 10/252,129, Response filed Jul. 10, 2015 to Final Office Action mailed Apr. 22, 2015", 21 pgs.

"U.S. Appl. No. 10/252,129, Response filed Dec. 17, 2014 to Non Final Office Action mailed Sep. 23, 2014", 24 pgs.

"U.S. Appl. No. 13/285,916, Decision on Pre-Appeal Brief mailed Jul. 15, 2014", 2 pgs.

"U.S. Appl. No. 13/285,916, Examiner Interview Summary mailed Jan. 22, 2015", 3 pgs.

"U.S. Appl. No. 13/285,916, Final Office Action mailed Apr. 23, 2014", 16 pgs.

"U.S. Appl. No. 13/285,916, Non Final Office Action mailed Oct. 30, 2014", 19 pgs.

"U.S. Appl. No. 13/285,916, Notice of Allowance mailed Mar. 3, 2015", 5 pgs.

"U.S. Appl. No. 13/285,916, Pre-Appeal Brief Request filed Jun. 20, 2014", 5 pgs.

"U.S. Appl. No. 13/285,916, PTO Response to Rule 312 Communication mailed Jun. 9, 2015", 2 pgs.

"U.S. Appl. No. 13/285,916, Response filed Jan. 30, 2015 to Non Final Office Action mailed Oct. 30, 2014", 22 pgs.

"U.S. Appl. No. 13/285,916, Supplemental Notice of Allowabilfty mailed Apr. 1, 2015", 4 pgs.

(56) References Cited

OTHER PUBLICATIONS

"U.S. Appl. No. 13/285,916, Supplemental Notice of Allowability mailed Jun. 18, 2015", 4 pgs.
"U.S. Appl. No. 14/268,986, Final Office Action mailed Dec. 3, 2015", 13 pgs.
"U.S. Appl. No. 14/268,986, Non Final Office Action mailed Jun. 17, 2016", 17 pgs.
"U.S. Appl. No. 14/268,986, Non Final Office Action mailed Jul. 2, 2015", 13 pgs.
"U.S. Appl. No. 14/268,986, Notice of Non-Compliant Amendment mailed Aug. 12, 2014", 3 pgs.
"U.S. Appl. No. 14/268,986, Preliminary Amendment filed May 5, 2014", 7 pgs.
"U.S. Appl. No. 14/268,986, Response filed Apr. 4, 2016 to Final Office Action mailed Dec. 3, 2016"21 pgs.
"U.S. Appl. No. 14/268,986, Response filed Oct. 2, 2015 to Non Final Office Action mailed Jul. 2, 2015", 10 pgs.
"U.S. Appl. No. 14/268,986, Response filed Nov. 12, 2014 to Notice of Non-Compliant Amendment mailed Aug. 12, 2014", 3 pgs.
"U.S. Appl. No. 14/268,986, Supplemental Preliminary Amendment filed May 9, 2014", 7 pgs.
"U.S. Appl. No. 14/595,074, Final Office Action mailed Jan. 14, 2016", 10 pgs.
"U.S. Appl. No. 14/595,074, First Office Action Interview Office Action Summary mailed Jun. 22, 2015", 4 pgs.
"U.S. Appl. No. 14/595,074, Pre-Interview First Office Action mailed Apr. 2, 2015", 4 pgs.
"U.S. Appl. No. 14/595,074, Preliminary Amendment filed Jan. 19, 2015", 10 pgs.
"U.S. Appl. No. 14/595,074, Response filed Jun. 2, 2015 to First Office Action Interview Pilot Program Pre-Interview mailed Apr. 2, 2015", 2 pgs.
"U.S. Appl. No. 14/595,074, Response filed Aug. 24, 2015 to First Action Interview Office Action Summary mailed Jun. 22, 2015", 18 pgs.
"U.S. Appl. No. 14/790,661, Preliminary Amendment filed Jul. 6, 2015", 7 pgs.

\* cited by examiner

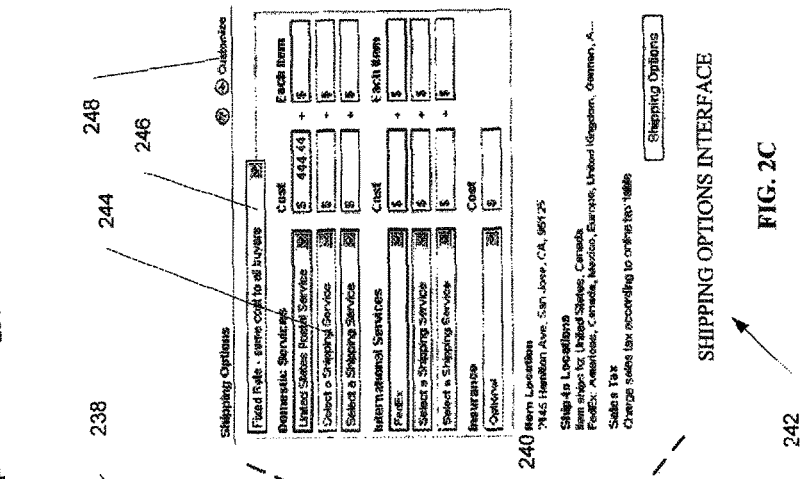
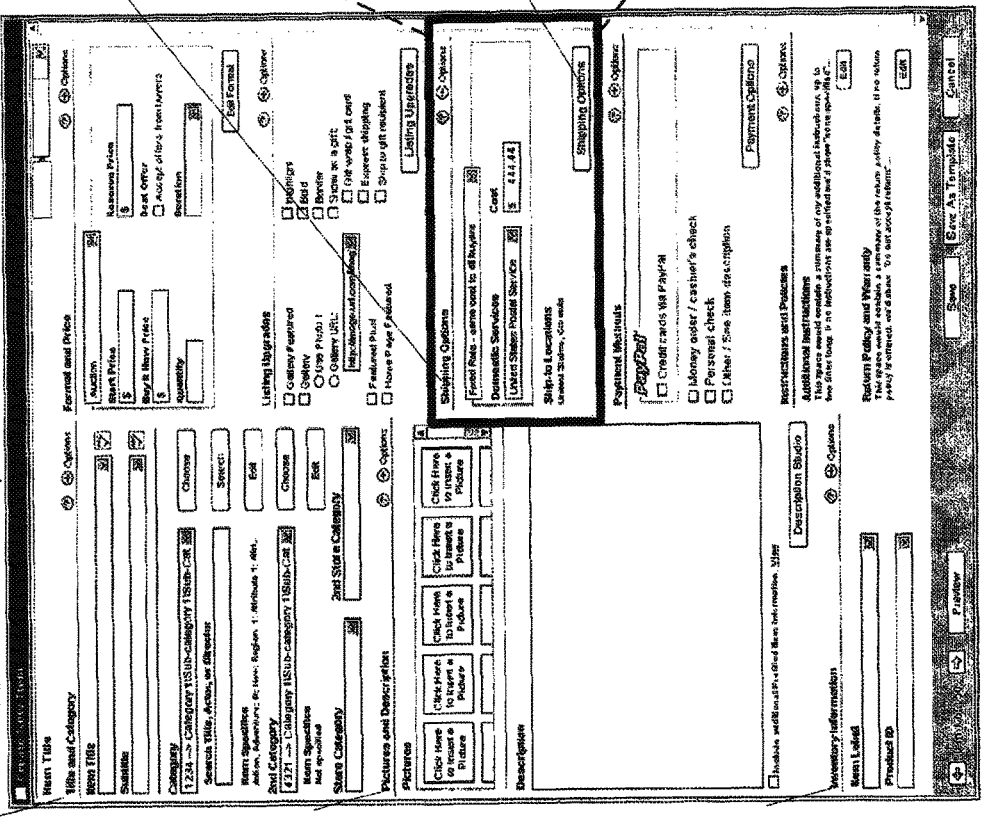
FIG. 2B
FIG. 2C

METHOD AND SYSTEM FOR SHARING METADATA BETWEEN INTERFACES

RELATED APPLICATION

This application is a continuation of U.S. patent application Ser. No. 11/508,420, filed on Aug. 23, 2006, the benefit of priority of which is claimed hereby, and of which is incorporated by reference herein in its entirety.

FIELD

This application relates to a method and system for sharing metadata between interfaces, and specifically sharing metadata between a client interface and a web interface.

BACKGROUND

Network applications are commonly distributed utilizing two different approaches, a client application and a web application. For example, a service or product provider (hereinafter, provider) operating over a network (e.g., the Internet) may utilize a client application running on a client device and a web server serving web pages to a client web application to exchange various types of data, such as transaction data or user configuration data.

In the first approach, a client application is created, or hard coded, in a programming language such as C++ and then offered to users as a download via a network, or distributed by another means such as compact disk (CD), etc. Once downloaded and/or installed, the user may interact with the client application in communication with the provider's server to exchange data. As with most computer applications for users, the client application is centered on a user interface that provides functionality and displays data generated and communicated by the provider as well as data generated by the user, which may be uploaded to the provider's server.

In order to provide a consistent user experience for the user of the client application and the user of a web application, the provider has to maintain and release new versions of each application whenever a change occurs. Consequently, a provider may incur significant costs in time and resources to ensure a new client application is generated each time a change is made to the web application and vice versa.

BRIEF DESCRIPTION OF DRAWINGS

The present embodiments are illustrated by way of example and not limitation in the figures of the accompanying drawings, in which like references indicate similar elements and in which:

FIG. 2B illustrates an example embodiment of a user interface (UI) screenshot that may be associated with a programmatic framework.

FIG. 2C illustrates an example embodiment of a user interface screenshot that may be associated with or activated from another UI within the programmatic framework.

DETAILED DESCRIPTION

In the following description, for purposes of explanation, numerous specific details are set forth in order to provide a thorough understanding of the various embodiments herein. It will be evident, however, to one skilled in the art that these and other embodiments may be practiced without these specific details.

In one embodiment, a networked system includes a web application and distributed client applications configured to give their respective users a similar user experience on each application type. To facilitate providing a similar user experience, a common framework (e.g., user interface and supporting logic) may be used in each application such that a single file containing configuration data (e.g., operational rules, framework data, UI data, etc.) may be communicated to each application and utilized by each framework to create a substantially similar user experience with respect to the user interface and its underlying functionality.

These example embodiments allow for a network system to leverage the advantages of the client application and the web application. For example, a client application has an advantage of being flexible, such that a user may interact with the client application offline. On the other hand, a web application dynamically provides user interface data to one or more web clients that can be accessed by any machine on a network (e.g., Internet) where the machine includes a web application, such as a common web browser. The dynamic flow of data has a few advantages. For example, any change to the user interface may be implemented on the provider's web server, which seamlessly shows up the next time the user refreshes or enters the provider's link and downloads the new page data. Although this approach provides a lot of flexibility with respect to updating functionality, it does not allow for offline activities since the application's functionality is derived from data received dynamically from the provider's web server.

Figure 1:
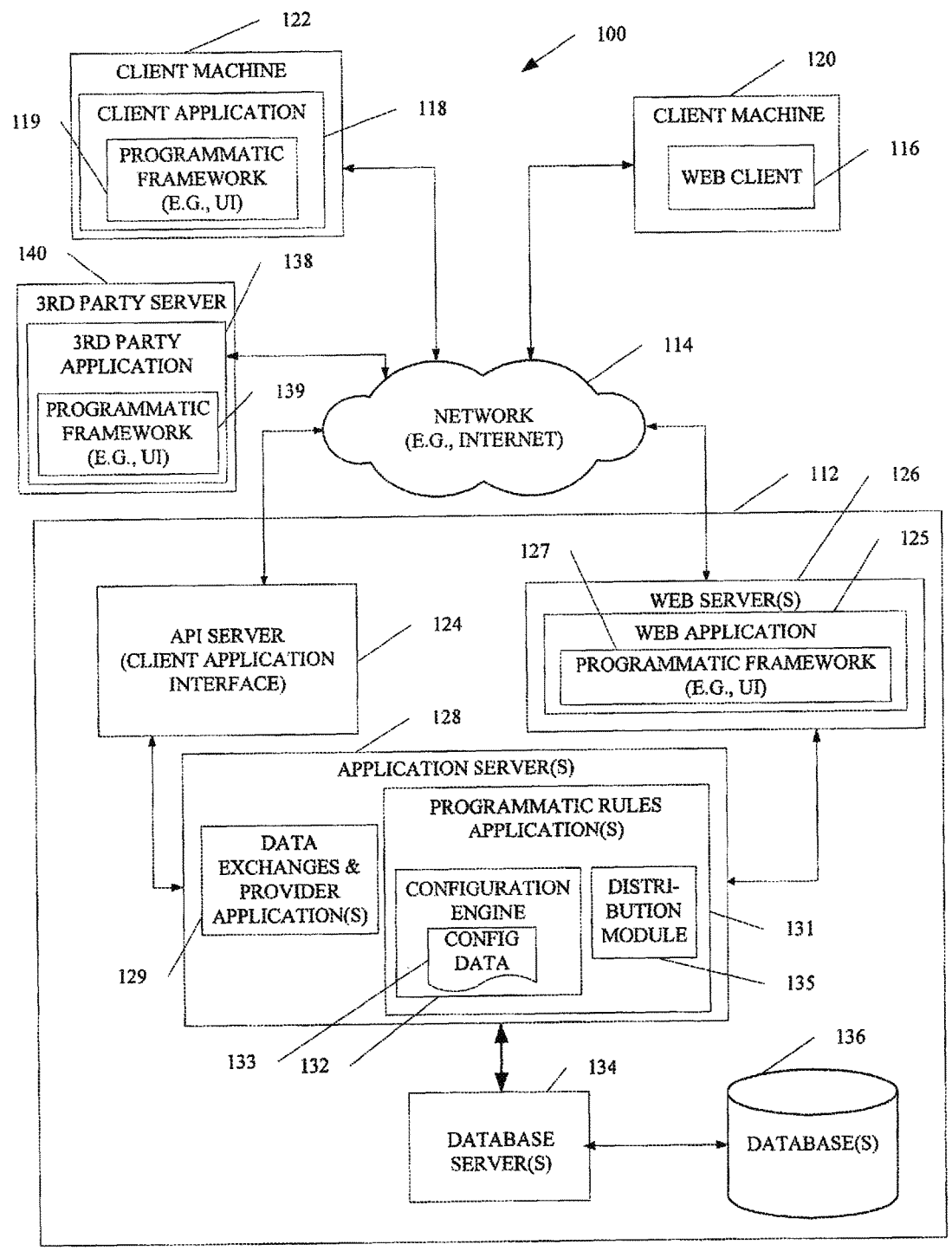
FIG. 1 is a network diagram of an example embodiment depicting a data exchange system having a client-server architecture configured for exchanging data over a network.

FIG. 1 is a network diagram depicting a data exchange system 100, according to one embodiment, having a client-server architecture configured for exchanging data over a network. For example, the data exchange system 100 may be a trading/commerce system where clients may communicate and exchange data with the trading/commerce system, the data may include product listings, auction bids, feedback, etc.

A data exchange platform, in an example form of a network-based provider 112, provides server-side functionality, via a network 114 (e.g., the Internet) to one or more clients. The one or more clients may include users that may utilize the data exchange system 100, and more specifically the network-based provider 112, to facilitate data exchanges, such as various types of transactions (e.g., purchases, listings, feedback, etc.). These data exchanges may be dependent upon user selected functions available through a client/user interface (UI) (e.g., see FIG. 2B). The UI may be associated with a client machine, such as a client machine 120 utilizing a web client 116 served from a web application 125 operating on a web server 126. The UI may also be associated with a client machine 122 utilizing a client application 118, or a third party server 140 hosting a third party application 138.

The web server 126, the client application 118, and the third party application 138 may each host a similar programmatic framework (e.g., programmatic frameworks 119, 127, 139) to provide a user of the client machine 122, third party server 140 or the client machine 120 a similar experience in functionality for a given transaction. For example, this functionality may include similarities of a particular look and feel of a user interface (UI) (e.g., what and how data is displayed on the UI, see FIG. 2B), application functionality based on validation rules and/or rolls for the user, programmatic logic to determine a sequence of actions or displays, and dependency rules to determine what is displayed based on user interaction. It can be appreciated that in other embodiments there may be a multitude of web servers 126 operating on one or more network-based providers 112, but for simplicity a single network-based providers 112 and a single web server 126 is discussed hereinafter.

In various embodiments, the third party server 140 may or may not include the third party application 138. The third party application 138 may be remote from the third party server 110 but still be in communication via the network 114. In one embodiment, the third party application 138 may only include a subset of functionality (e.g., look and feel of the UI, etc.) that may be associated with the client application 118 and the web application 125. This may provide a programmer or administrator of the third party application 138 with the flexibility to pick and choose (if not mandated by the network-based provider 112) for its programmatic framework 139 which functions it will have in common with the programmatic frameworks 119, 127 of the client application 118 and the web application 125, respectively.

Turning specifically to the network-based provider 112, an application program interface (API) server 124 and a web server 126 are coupled to one or more application servers 128. The application servers 128 host one or more data exchange and provider applications 129, and one or inure programmatic rules application(s) 131. The application servers 128 are, in turn, shown to be coupled to one or more database server(s) 134 that facilitate access to one or more database(s) 136.

The programmatic rules application(s) 131 may include a configuration engine 132 that may process configuration data 133 and a distribution module 135 to distribute the configuration data 133 to the client application 118, the web application 125 of the web server 126, and the third party application 138. The configuration data 133 may include but is not limited to framework data, programmatic logic, and validation rules. Once received, the client application 118, the web application 125, and the third party application 138 may utilize the configuration data 133 within their respective programmatic frameworks 119, 127, 139. This may include implementing programmatic changes to existing or addition of functionality, to the client applications 118, the third party application 138, and the programmatic components served from the web application 125 to the web client 116, without having to create a new client application 118, a new third party application 138 and a new web application 125. In this example embodiment, the client application 118, the third party application 138, and the web application 125 may be updated by a single file or electronic document, such as the configuration data 133. Although the configuration data 133 is discussed herein as being distributed via a network, in other embodiments the configuration data 133 may be distributed via other distribution media, such as compact disk, floppy disk, flash media, etc. A more detailed discussion of embodiments associated with the configuration data 133 is discussed below.

The network-based provider 112 may include functionality that periodically checks (e.g., via polling) the version of the configuration data 133 being implemented by the client application 118, the web application 125, and the third party application 138. In cases where a particular application is out of date, the network-based provider 112 may push the new configuration data to the out of date application. In another embodiment, the applications may request, automatically or by user interaction, a configuration data version status. If out of date, the applications may then request the updated version of the configuration data 133.

The web client 116 may access the various data exchange and provider applications 129 and programmatic rules application(s) 131 via the web interface supported by the web server 126. Similarly, the client application 118 may access the various services and functions provided by the data exchange and provider applications 129 and the programmatic rules application(s) 131 via the programmatic interface provided by the API server 124. The client application 118 may, for example, be a seller application (e.g. the TurboLister® application developed by eBay Inc., of San Jose, Calif.) to enable sellers to author and manage listings at the network-based provider 112 in an off-line manner, and to perform batch-mode communications between the client application 118 and the network-based provider 112.

As mentioned above, FIG. 1 also illustrates the third party application 138, executing on the third party server machine 140, as having programmatic access to the network-based provider 112 via the programmatic interface provided by the API server 124. For example, the third party application 138 may utilize information retrieved from the network-based provider 112 to support one or more features or functions on a website hosted by the third party. The third party website may, for example, provide one or more promotional, marketplace or payment functions that are supported by the relevant applications of the network-based provider 112.

For simplicity, the discussion hereafter will focus on client application 118 and the web application 125. It can be appreciated the third party application 138 may have substantially similar functionality and application to that of the client application 118 with respect to the various embodiments described herein.

Figure 2A:
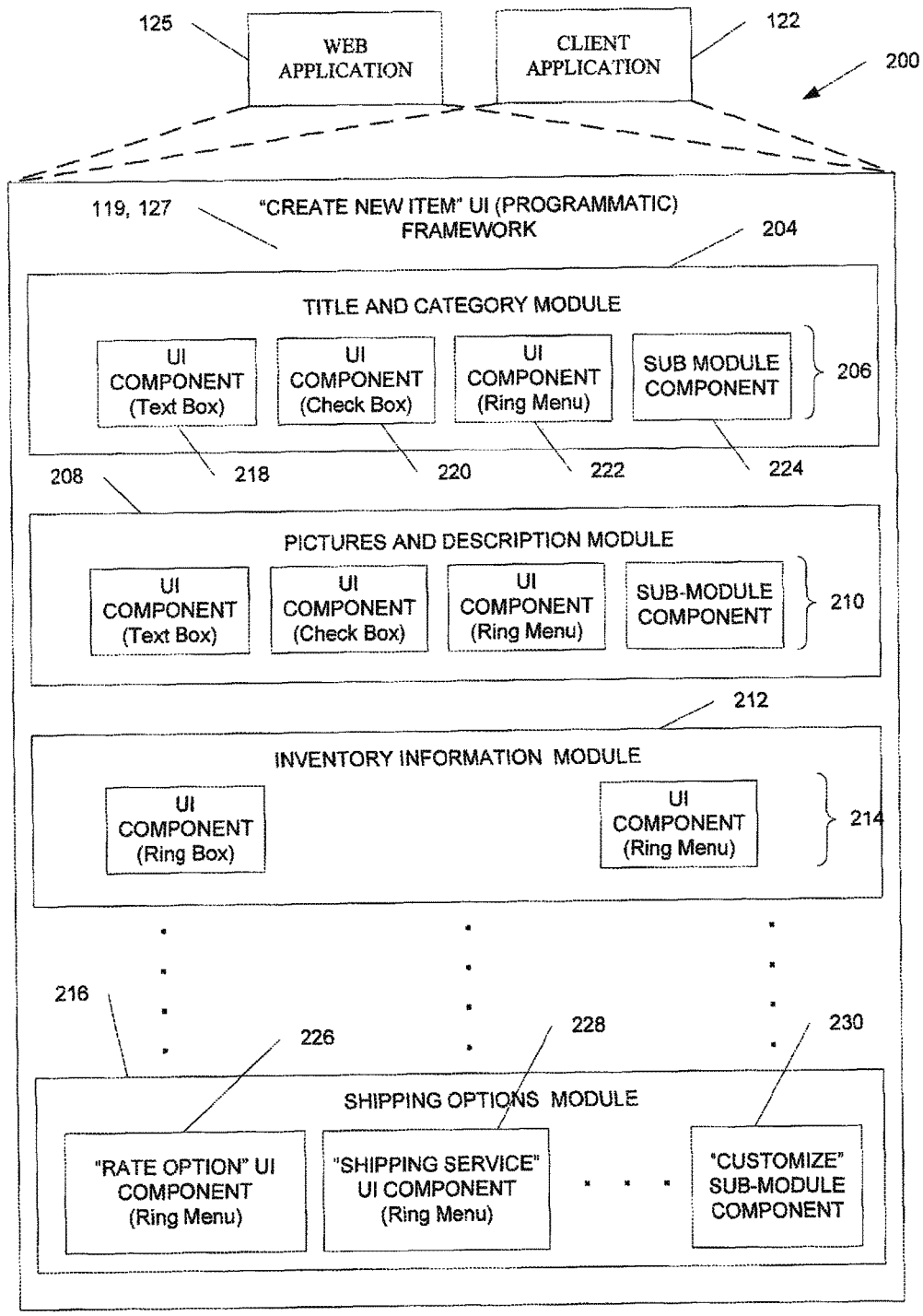
FIG. 2A illustrates modules in example embodiment of programmatic frameworks associated with a client application and a web application.

FIG. 2A illustrates modules, according to an example embodiment, of the programmatic frameworks 119, 127 associated with the client application 122 and the web application 125, respectively. The programmatic frameworks 119, 127 (e.g., a UI framework) may include various types of framework data, which includes but is not limited to modules, such as a title and category module 204, a pictures and description module 208, an inventory information module 212, and a shipping options module 216. These modules are for example purposes only, and it can be appreciated that, in various embodiments, the number and type of modules included in a programmatic framework (e.g., programmatic frameworks 119, 127) may be dependent upon the functions associated with an application of the network-based provider 112. In various embodiments, when these modules are utilized within their respective frameworks, they may create and provide various programmatic responses. These programmatic responses may include input/output functions and displays associated with a user interface, such as a graphical user interface associated with the client machines 170, 122.

The title and category module 204, the pictures and description module 208, and the inventory information module 212, according to one embodiment, includes various component sets such as component sets 206, 210, 214, respectively. For example, the component set 206 of the title and category module 204 include a UI component 218 in the form of a text box, a UI component 220 in the form of a check box, a UI component 222 in the form of a ring menu, and a sub-module component 224. For simplicity, the component set 210 and the component set 214 include similar components as component set 206. However, it can be appreciated that in various embodiments, the pictures and description module 208 and the inventory information module 212 may have less, additional, or different components tin their respective component sets (e.g., component sets 210, 214).

The shipping options module 216 includes specific components that will be discussed further with reference to FIG. 2B. Specifically, these components are a rate option UI component 226, a shipping service UI component 228, and a customize sub-module component 230.

In one embodiment, a multitude of category modules and their respective UI components are included in the programmatic frameworks 119, 127 upon distribution of their respective applications, the client application 118 and the web application 125. The rules (e.g., configuration data 133) received and processed by the client application 118 and the web application 125 may determine which, if not all, of the multitude of category modules are activated and more specifically which, if not all, of the components of the component sets are used and how they are displayed and executed on the client machines (e.g., client machine 120, 122). This is how, for example, a single set of rules (e.g., configuration data 133) may be communicated to two independent applications (e.g., the client application 118 and the web application 125) such that each application maintains substantially similar functionality with respect to each other.

Additionally, in other embodiments, new components may be inserted into one or more existing modules of each framework. For example, the configuration data 133 may provide instruction to copy or duplicate an existing UI component from an existing module and inserted into the existing or another module. The configuration data 133 may then further define the new UI component's attributes and functionality as described herein for updating existing modules and components. In another embodiment, a new UI component may be received at the client application 118 and web application 125 for addition to the programmatic frameworks 119, 127 via the configuration data 133. In yet another embodiment, a UI component may be a generic UI component stored by the client application on the host machine and included and defined in the programmatic framework as determined by the configuration data 133.

FIG. 2B illustrates a UI screenshot 231 that may be associated with the programmatic frameworks 119, 127, according to an example embodiment. The UI screenshot 231 may include a title and category section 232 that may be associated with the title and category module 204 and its component set 206. Similarly, the UI screenshot 231 may include a pictures and description interface 234, and an inventory information interface 236, which may be associated with the pictures and description module 208 and the inventory information module 212.

Although shown here as identical, the UI screenshot 231 may have different look and feel between the two programmatic frameworks 119, 127 but still include substantially similar modules and components sets such that a single set of rules (e.g., configuration data 133) may be used to make programmatic changes in each application. For example, the title and category section 232 in the programmatic framework 119 and the programmatic framework 127 may include the UI component 222, which is a ring menu, and a UI component configured as a selectable text box (not shown), each configurable to perform similar functions but using a different interface. Although each of the components are common to each programmatic frameworks 119, 127, the set of rules (e.g., the configuration data 133) may be used to activate the ring menu UI component for the programmatic framework 119 and the selectable textbox UI component for the programmatic framework 127.

In one embodiment the UI screenshot 231 includes a shipping options interface 238. The shipping options interface 238 may be associated with the shipping options module 216 of FIG. 2A. The shipping options interface 238 includes a shipping options button 240. In one embodiment, the shipping options button 240 may activate or cause to display a shipping options interface 242 as illustrated in FIG. 2C. The shipping options interface 242 corresponds with the shipping options module 216 and its associated components. For example, a select a shipping service ring menu 244 corresponds to the shipping service UI component 228 of the shipping options module 216. Similarly, a fixed rate ring menu 246 may be associated with the rate option UI component 226 of the shipping options module 216. Additionally, a customize button 248 may be associated with the customize sub-module component 230 of the shipping options module 216. In one embodiment, the customize sub-module component 230 when activated by the customize button 248 generates a new interface which may include additional components, such as UI components for ring menus, check boxes, text boxes etc.

Figure 3:
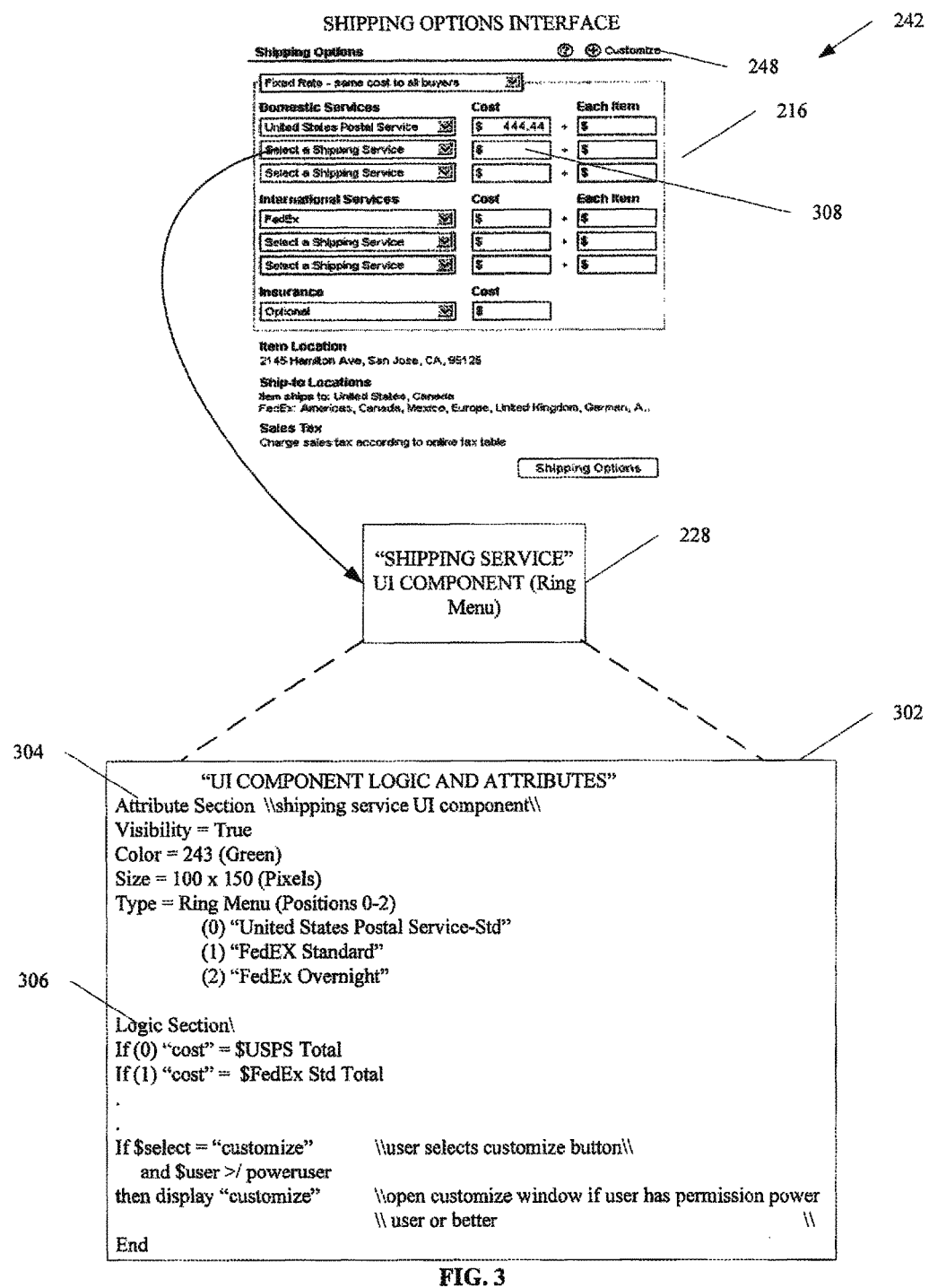
FIG. 3 illustrates an example embodiment of an options interface and its relationship to a UI component.

FIG. 3 illustrates an example embodiment of the shipping options interface 242 and its relationship to the shipping service UI component 228. The shipping service UI component 228 includes underlying programmatic logic and attributes, such as UI component logic and attributes 302. For example, the UI component logic and attributes 302 may include operational parameters that when executed within the shipping service UI component 228, cause a shipping options interface 242 to display a particular control that may be interacted with by a user. In this example, the control may be the select the shipping service ring menu 244 and may have attributes such as visibility, color, size, and type (e.g., ring menu). As illustrated in the UI component and logic attributes 302, the type is a ring menu including three positions each corresponding to a selectable shipping service (e.g., FedEx® overnight).

Additionally, the UI component logic and attributes 302 may include a logic section 306. The logic section 306 may include programmatic logic or rules for how the programmatic frameworks 119, 127 performs with respect to what a user may see and do on the client application 122 and the web client 116. For example, as shown in logic section 306, if the ring menu position of the select a shipping service ring menu 244 has a position value of zero, then a cost field 308 of the shipping options interface 242 may be updated with the United States Postal Service total representing the cost to ship a particular item.

In various other embodiments, the logic section 306 may include logic such that when a particular UI component is activated (e.g., ring menu position 1 selected) another module or sub-module within the programmatic frameworks 119, 127 is activated resulting in an underlying action and/or the display of a new user interface or additional user interface components within an existing interface, such as shipping options interface 242. In another example, the customize button of shipping options interface 242 may be selected by a user. Codified logic within the logic section 306 may determine whether or not a new customize window opens based on the selection of the customize button 248 and the user's (e.g., of client machine 122) access privileges based on a login and access criteria. It can be appreciated that in various embodiments many types of attributes and logic may be applied to the UI component logic and attributes 302, and what is illustrated here with respect to FIG. 3 and its accompanying description is by example only.

Figure 4:
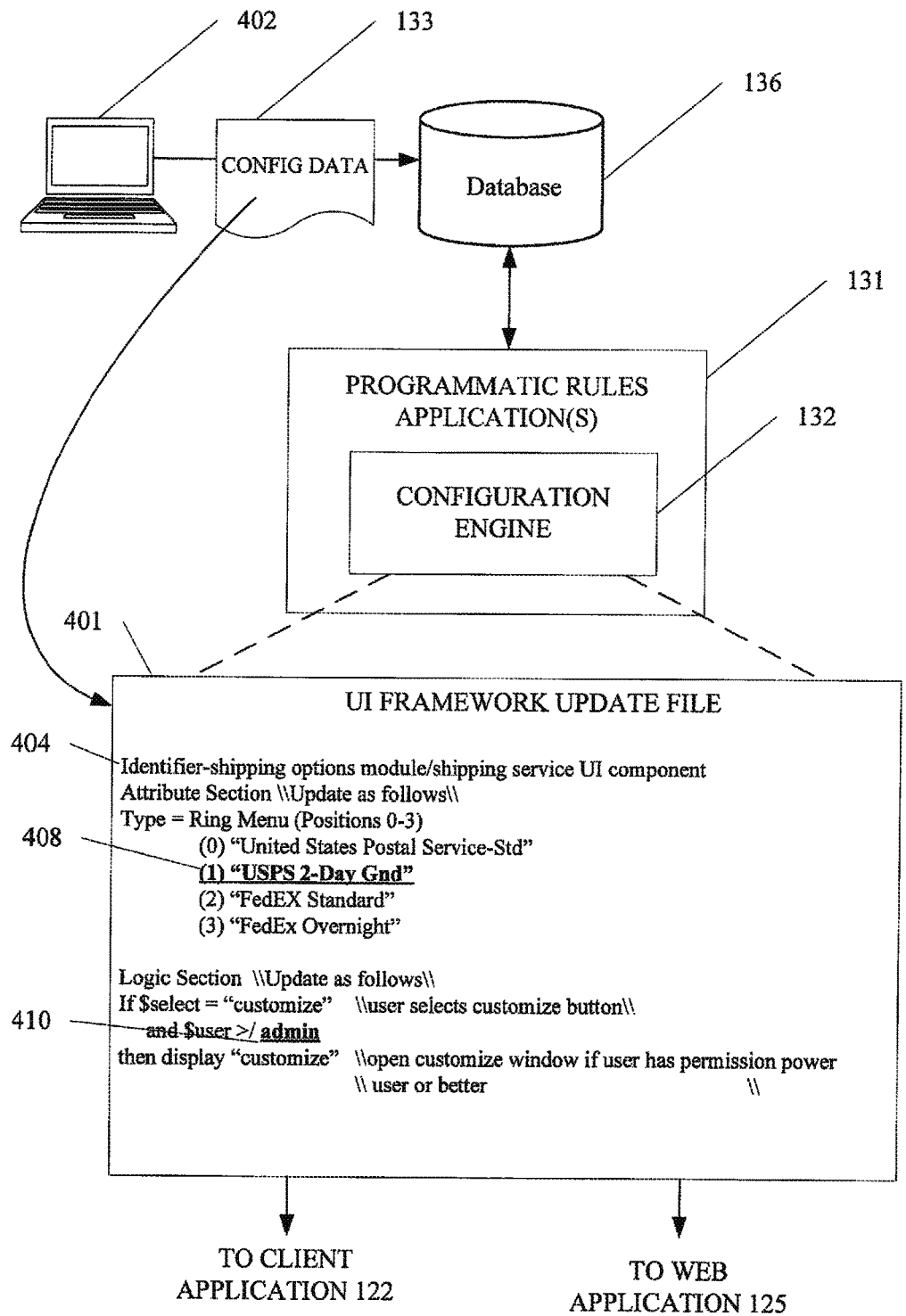
FIG. 4 illustrates an example embodiment of configuration data that may be distributed to a web application and a client application to update their respective UI frameworks.

FIG. 4 illustrates an example embodiment of the configuration data 133 that may be distributed to the web application 125 and the client application 118 to update their respective UI frameworks 127, 119. A user of computer system 402 may generate the configuration data 133 according to a programmatic language utilized by the programmatic framework 127, 119 of the web application 125 and the client application 118. For example, the programmatic framework 127, 119 may be implemented in an eXtensible Markup Language (XML) and the configuration data 133 may be metadata configured and recognizable by the components (e.g., shipping service UI component 228) of the modules (e.g., shipping options module 216) of the programmatic frameworks 119, 127. It can be appreciated in various embodiments, that the programmatic frameworks 119, 127 may be created using one of a multitude of programmatic languages such that the configuration data 133 may be utilized to update the functionality of the programmatic frameworks 119, 127 of the client application 122 and the web application 125, respectively.

A user of computer system 402, according to one embodiment, may create the configuration data 133 for distribution to the web application 125 and the client application 118. In one embodiment, the configuration data 133 is stored in the database(s) 136, which then may be accessed by the programmatic rules application(s) 131 via the database server(s) 134. In another embodiment, the computer system 402 is integrated into the network-based provider 112 and may be in direct communication with the programmatic rules application(s) 131. The programmatic rules application(s) 131 may provide the programmatic interface to the computer system 402 for generating the configuration data 133.

In one embodiment, the configuration engine 132 of the programmatic rules application(s) 131 may format the configuration data 133, as generated by computer system 402 and/or retrieve from database(s) 136, into a format usable by the client application 118 and the web application 125 and their respective programmatic frameworks 119 and 127. The configuration data 133 does not require additional formatting and the configuration engine 132 and the programmatic rules application(s) 131 are utilized to distribute the configuration data 133 to the web application 125 and the client application 118. In one embodiment, the configuration data 133 may be distributed as a text file over the network 114 to the client application 118 on the client machine 122 or within an internal network within the network-based provider 112 within communication with the web application 125 within the web server 126. In other embodiments, the configuration data 133 is distributed or communicated to the web application 125 and the client application 118 in one of many types of files known in the art, such as an encrypted file, a binary file, a text file, etc.

A UI framework update file 401 illustrates an example embodiment of the configuration data 133 composed to update a UI component such as the UI component logic and attributes 302 portion of the shipping service UI component 228. In this example, the UI framework update file 401 includes an identifier 404. The identifier 404 may be any string or alphanumeric character or other unique identifier indicating which UI component of which module to update in the programmatic frameworks 119, 127. The purpose of identifier 404 is to ensure the appropriate UI component in the appropriate module is correctly updated. As illustrated here, identifier 404 identifies the shipping options module 216 and the shipping service UI component 228.

The UI framework update file 401 may include updates to the various portions of the UI components, such as updates to the UI component logic and attributes 302 of the shipping service UI component 228. For example, an update 408 illustrates an addition to the ring menu of shipping service UI component 228, and more specifically adds an additional shipping service that may be selected from the ring menu. An update 410 illustrates a change to the logic section 306 of the UI component logic and attributes 302. Specifically, the update 410 changes the permissions required for the customization window to be activated. Because the programmatic framework 119 of the client application 118 and the programmatic framework 127 of the web application 125 are substantially similar and share substantially the same modules the same UI framework update file 401 may be used to update each programmatic framework 119 and 127.

In another embodiment (not shown), and update may include the addition of a new UI component to the programmatic frameworks 119, 127. For example, the UI framework update file 401 may include instructions to add a new UI component from the existing repository associated with the programmatic framework, and attribute values to define the UI component attributes (e.g., UI position of new module, ring menu titles, etc.). The updates and the corresponding file text are only examples of updates to the attributes and logic section of a UI component within a UI (programmatic) framework, and that many variations in programmatic logic and attributes may exist which may be updated according to the methods describes herein.

Figure 5:
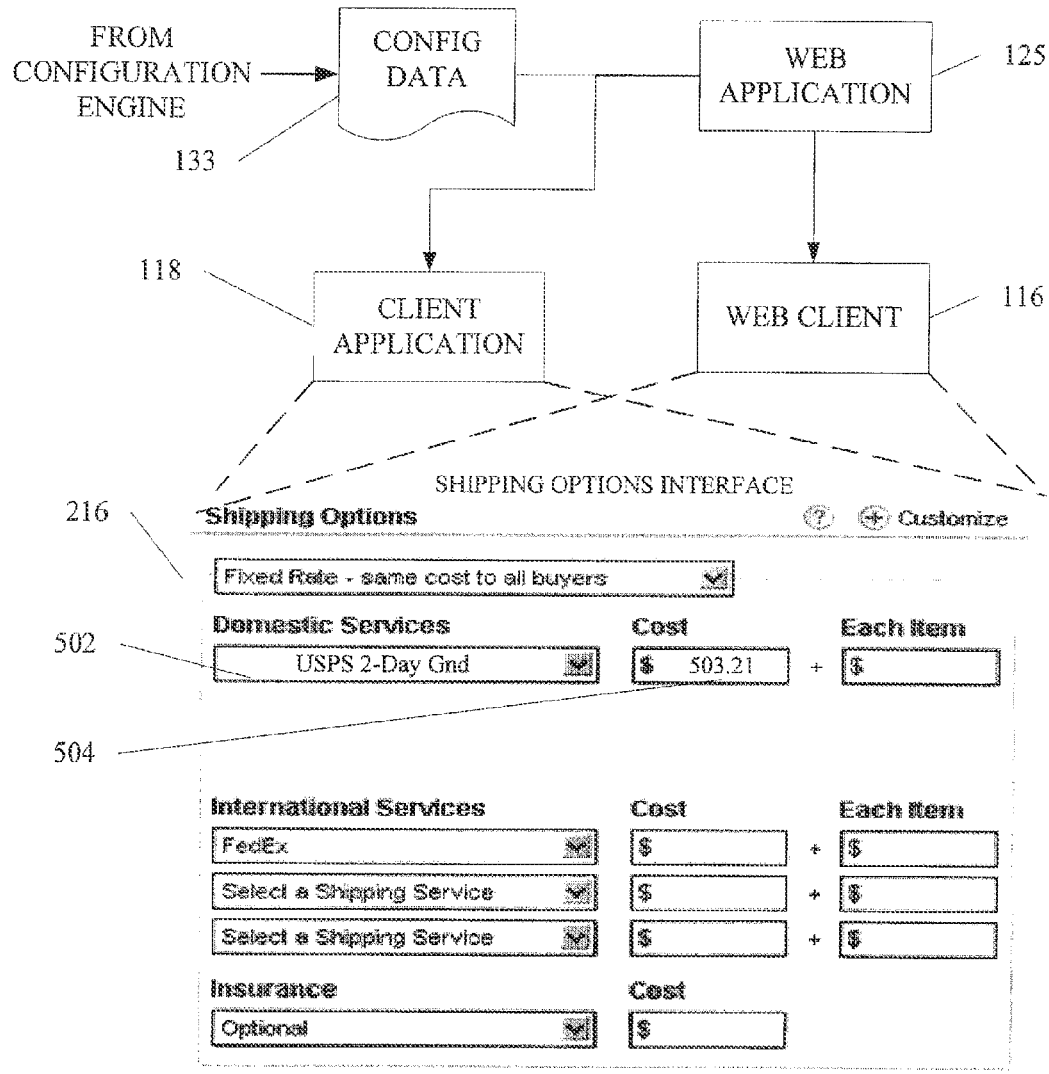
FIG. 5 illustrates an example embodiment of configuration data propagating from a configuration engine to a framework, and specifically a user interface.

FIG. 5 illustrates an example embodiment of the propagation of the configuration data 133, and specifically the communication of the example UI framework update file 401 to the web client 116 and the client application 122. In this example, the UI framework update file 401 is for updating the shipping options interface 242. In various embodiments, all or a portion of the UI framework update file 401 may be shared between the client application 118 and web application 125. In such a manner, particular instructions or data may be targeted to either or bath of the web client 116 and the client application 122.

The ring menu 502 of the shipping options interface 242 illustrates the addition of the USPS to the ground option as discussed with reference to the update 408 in FIG. 4. Additionally, the cost field 504 may also be updated to reflect the new ring menu selection. Although not shown, the shipping service UI component 228 may include the necessary programmatic functions to calculate the cost field 504 and may also have to be updated accordingly. In other embodiments, the cost field 504 and its contents are a local or global variable(s) within the programmatic frameworks 119, 127, thus they may be available to other portions of the programmatic frameworks 119, 127 (e.g., a calculations module). These other portions may be in communication with elements and components external to the host client machine 120, 122 to acquire data that may be necessary for calculations, inquiries (user or system), etc. (e.g., obtaining the latest shipping rates from a shipper's web site).

Figure 6A:
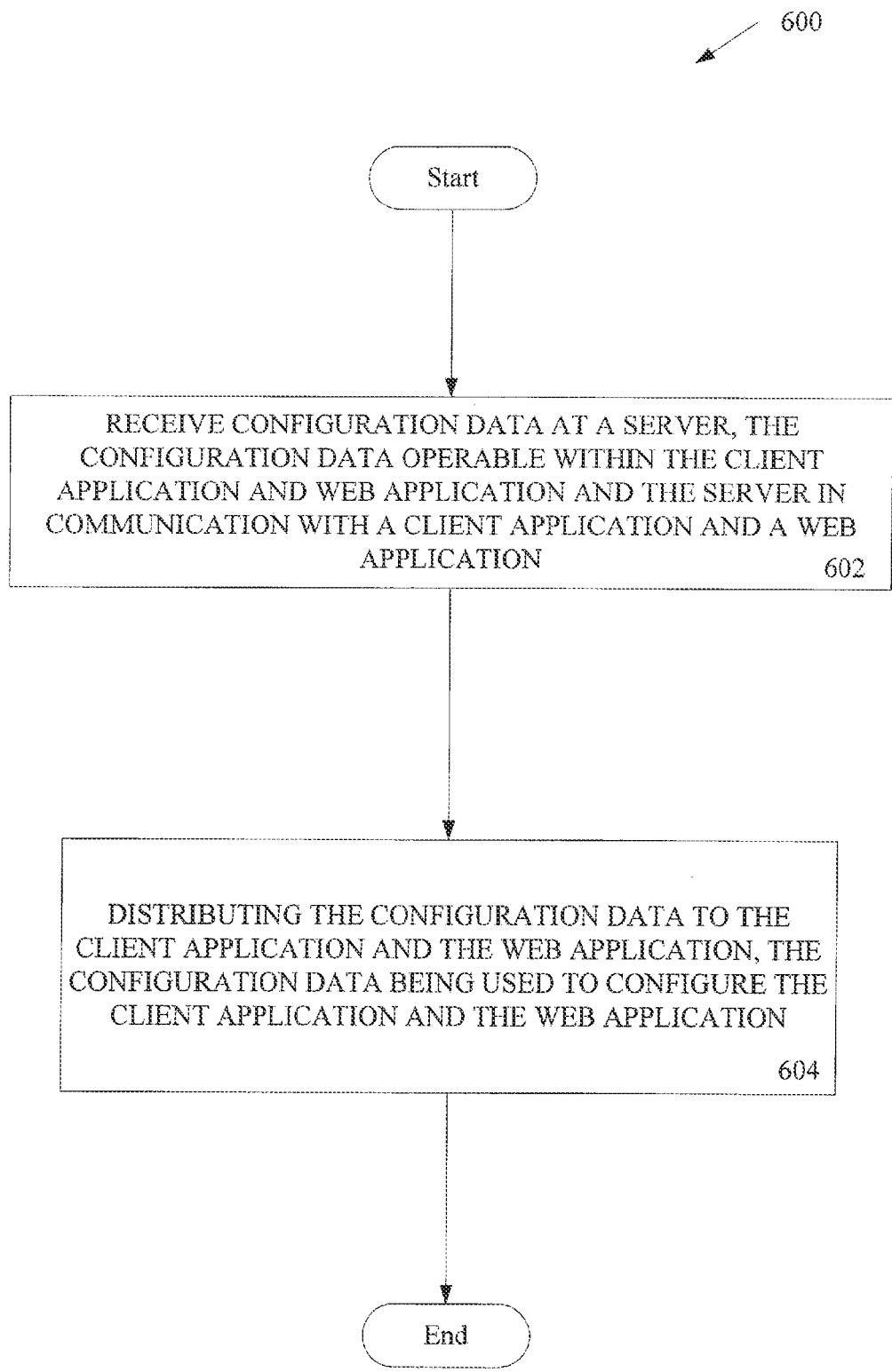
FIG. 6A is a flow chart, according to an example embodiment, illustrating the operations of distributing configuration data to a client application and a web application

FIG. 6A is a flow chart 600, according to an example embodiment, illustrating the operations of distributing the configuration data 133 universal to the client application 118 and the web application 125. At operation 602, the server (e.g., application servers 128) receives the configuration data operable within the client application 118 and web application 125. In one embodiment, the server is communicatively coupled to the client application 118 and the web application 125 via the network 114 (e.g., Internet, intranet, etc.). In another embodiment to distribute the configuration data 133, the client machine 122 hosting the client application 118 (or other networked device, see description with reference to FIG. 7) may also include applications (e.g., the programmatic rules application(s) 131), which may operate in the capacity of a peer machine in a peer-to-peer (or distributed) network environment, to provide a source for the distribution of the configuration data 133.

At operation 604, the server distributes the configuration data 133 to the client application 118 and the web application 125. The configuration data 133 may then be used to configure the client application 118 and the web application 125. In one embodiment, the server retrieves the configuration data 133 from a database (e.g., database(s) 136 via database server(s) 134). In another embodiment, the configuration data 133 is generated by a user via a programmatic interface and distributed to the client application 118 and the web application 125 prior to being stored in the database.

Figure 6B:
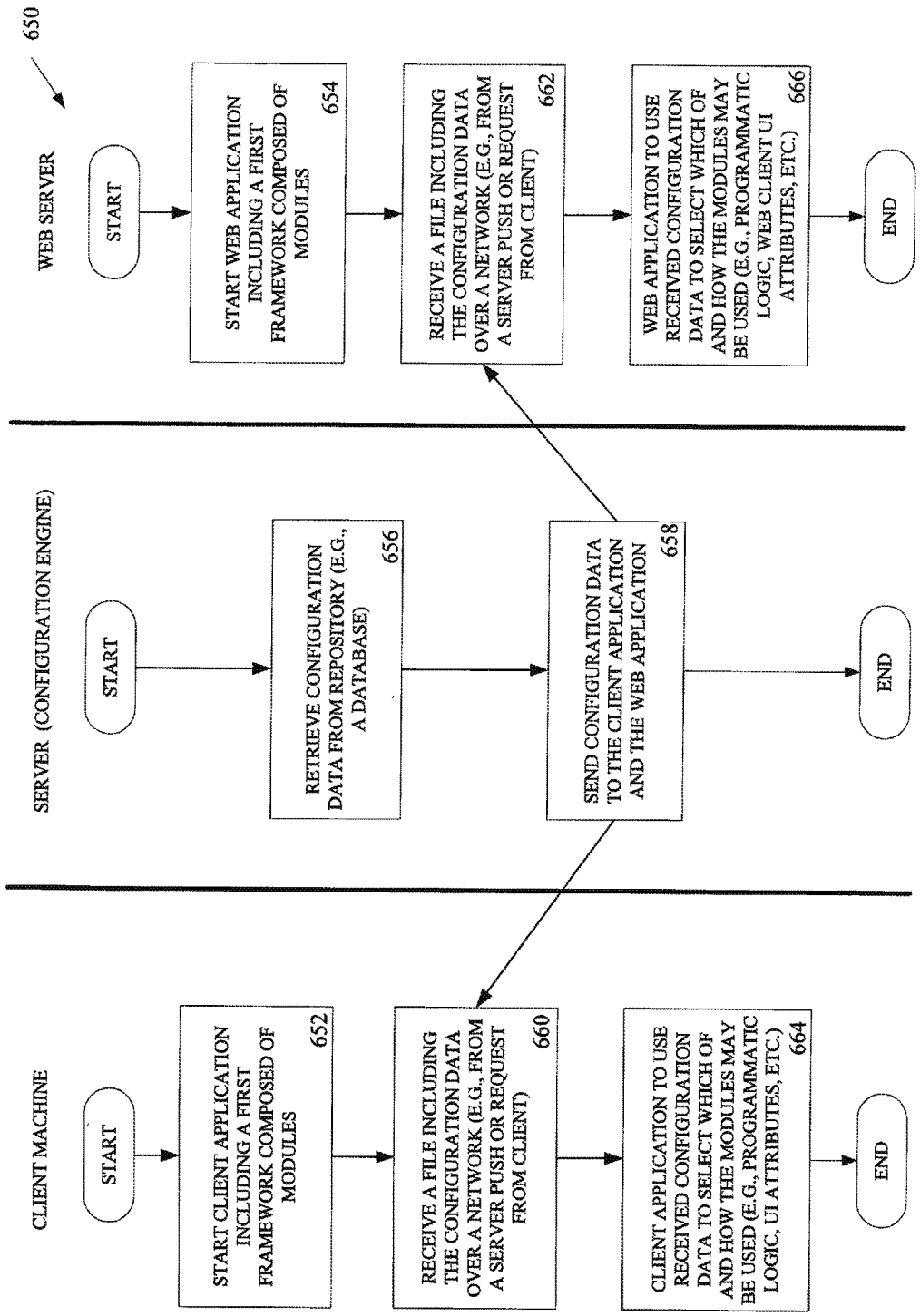
FIG. 6B is a flow chart, according to an example embodiment, illustrating the distribution and use of the configuration data by a client application and a web application.

FIG. 6B is a flow chart 650, according to an example embodiment, illustrating the distribution and use of the configuration data 133 by the client application 118 and the web application 125. At operations 652 and 654, the client application 118 and the web application 125 are started and require updated configuration data. The client application 118 and the web application 125 may include a first framework and a second framework, respectively. Each framework is further composed of modules and components which may be executed, in an example embodiment, according to the rules and logic provided by the updatable configuration data (e.g., configuration data 133).

Based upon a request to the server for updated configuration data or a command to push the configuration data to the applications, at operation 656, the server retrieves the configuration data 133 from a repository, such as database(s) 136. At operation 658, the server sends (e.g., via the network 114) the configuration data 133 to the client application 118 and the web application 125. As discussed above, other embodiments may also include communicating the configuration data 133 to the third party application 138.

At operations 660 and 662, the client application 118 and the web application 125 receive the configuration data 133. In one embodiment, the configuration data 133 is received over the network 114 as a file recognizable by each application as a configuration data file. The client application 118 and the web application 125 may then use the received configuration data 133 to select which of and how the modules may be used to generate the desired user interface, including the functionality behind the user interface operations. As discussed above, this is done in part through implementing programmatic logic, setting of UI attributes, etc., via the configuration data 133 and the respective frameworks of each application.

Figure 7:
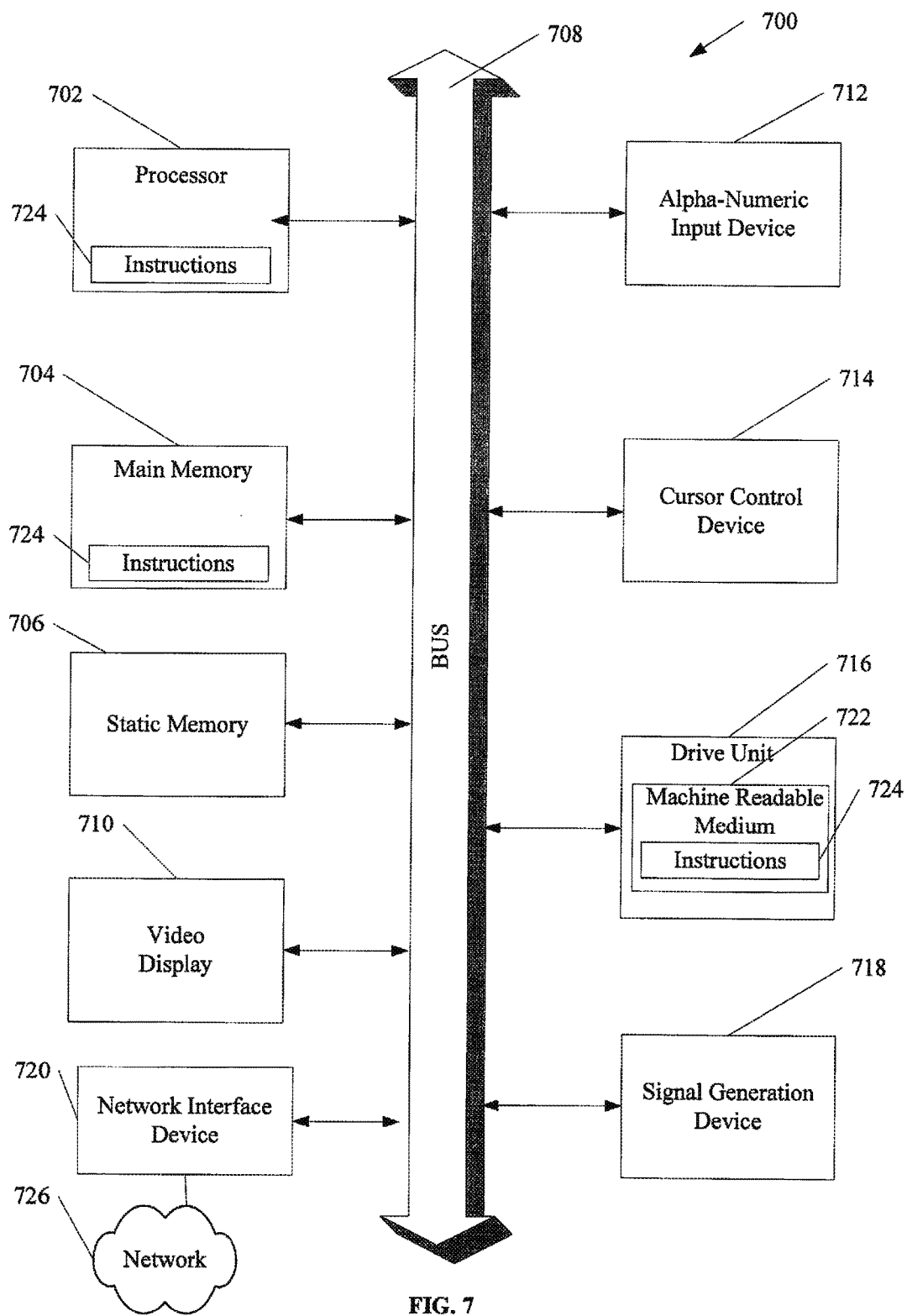
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term machine shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g. a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term machine-readable medium shall accordingly be taken to include, hut not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
in an automated operation performed using one or more computer processor devices configured to perform the automated operation, updating a web application and a corresponding client application by distributing configuration data in common to a web server managing the web application and to a client device on which the client application is installed, the configuration data comprising a single configuration file that is usable both by the web application and by the client application to similarly configure, without creating a new application, corresponding programmatic modules of the web application and the client application respectively, configuration of each of the corresponding programmatic modules comprising updating of the respective programmatic module to implement for the respective application of which it forms part at least one of:
programmatic changes to one or more existing functionalities, and programmatic addition of one or more new functionalities.

2. The method of claim 1, wherein the configuration data includes framework data for configuration of a common programmatic framework of the web application and the client application.

3. The method of claim 1, wherein the configuration data includes programmatic logic for configuration of one or more of the programmatic modules.

4. The method of claim 1, wherein the configuration data includes validation rules.

5. The method of claim 4, wherein the validation rules are configured to enable determination of user authorization for using the client application and the web application.

6. The method of claim 1, wherein the web application and the client application have a common programmatic framework that comprises a plurality of common programmatic modules that form part both of the web application and the client application.

7. The method of claim 6, wherein the configuration data is configured for use by the web application to select a first one of the plurality of common programmatic modules for generating a first programmatic response, and the configuration data being configured for use by the client application to select a second one of the common programmatic modules for generating a second programmatic response, the first programmatic response and the second programmatic response providing common functionality to respective users.

8. The method of claim 7, wherein the configuration data includes coded logic for use in selecting components of the first and second programmatic modules that are to be used in generating the first and second programmatic responses, respectively.

9. A system comprising:
a configuration engine comprising at least one computer processor device configured to receive configuration data; and
a distribution module comprising one or more computer processor devices configured to update a web application and a corresponding client application by distributing the configuration data in common to a web server managing the web application and to a client device on which the client application is installed, the configuration data comprising a single configuration file that is usable both by the web application and by the client application to similarly configure, without creating a new application, corresponding programmatic modules of the web application and the client application respectively, configuration of each of the corresponding programmatic modules comprising updating of the respective programmatic module to implement for the respective application of which it forms part at least one of:
programmatic changes to one or more existing functionalities, and programmatic addition of one or more new functionalities.

10. The system of claim 9, wherein the configuration data includes framework data for configuration of a programmatic framework common to both the client application and the web application.

11. The system of claim 9, wherein the configuration data includes programmatic logic for configuration of one or more of the programmatic modules.

12. The system of claim 9, wherein the configuration data includes validation rules.

13. The system of claim 12, wherein the validation rules are configured to enable determination of user authorization for using the client application and the web application.

14. The system of claim 9, wherein the web application and the client application have a common programmatic framework that comprises a plurality of common programmatic modules that form part both of the web application and the client application.

15. The system of claim 14, wherein the configuration data is configured for use by the web application to select a first one of the plurality of common programmatic modules for generating a first programmatic response, and the configuration data being configured for use by the client application to select a second one of the common programmatic modules for generating a second programmatic response, the first programmatic response and the second programmatic response providing common functionality to respective users.

16. The system of claim 15, wherein the configuration data includes coded logic for use in selecting components of the first and second programmatic modules that are to be used in generating the first and second programmatic responses, respectively.

17. A non-transitory machine readable storage medium having stored thereon instructions for causing a machine to perform operations comprising:
updating a web application and a corresponding client application by distributing configuration data in common to the web application and to the client application, the configuration data comprising a single configuration file that is usable both by the web application and by the client application to similarly configure, without creating any of application, corresponding programmatic modules of the web application and the client application, configuration of each of the corresponding programmatic modules comprising updating of the respective programmatic module to implement for the respective application of which it forms part least one of:
programmatic changes to one or more existing functionalities, and programmatic addition of one or more new functionalities.

* * * * *

UNITED STATES PATENT AND TRADEMARK OFFICE
CERTIFICATE OF CORRECTION

PATENT NO. : 9,736,269 B2
APPLICATION NO. : 14/165359
DATED : August 15, 2017
INVENTOR(S) : Allen Yihren Liu et al.

Page 1 of 1

It is certified that error appears in the above-identified patent and that said Letters Patent is hereby corrected as shown below:

In the Claims

In Column 12, Line 62, in Claim 17, after "part" insert -- at --.

Signed and Sealed this
Twenty-sixth Day of June, 2018

Andrei Iancu
*Director of the United States Patent and Trademark Office*